(No Model.)
J. D. SCOTT.
AGRICULTURAL IMPLEMENT.
No. 337,525. Patented Mar. 9, 1886.
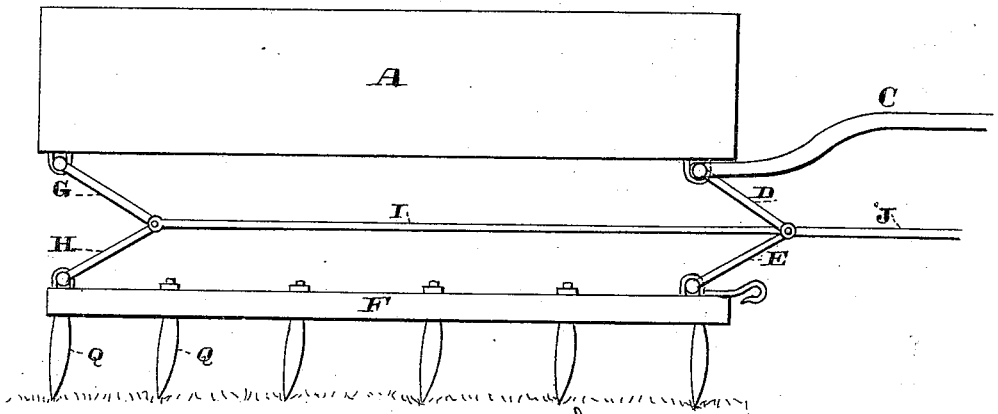
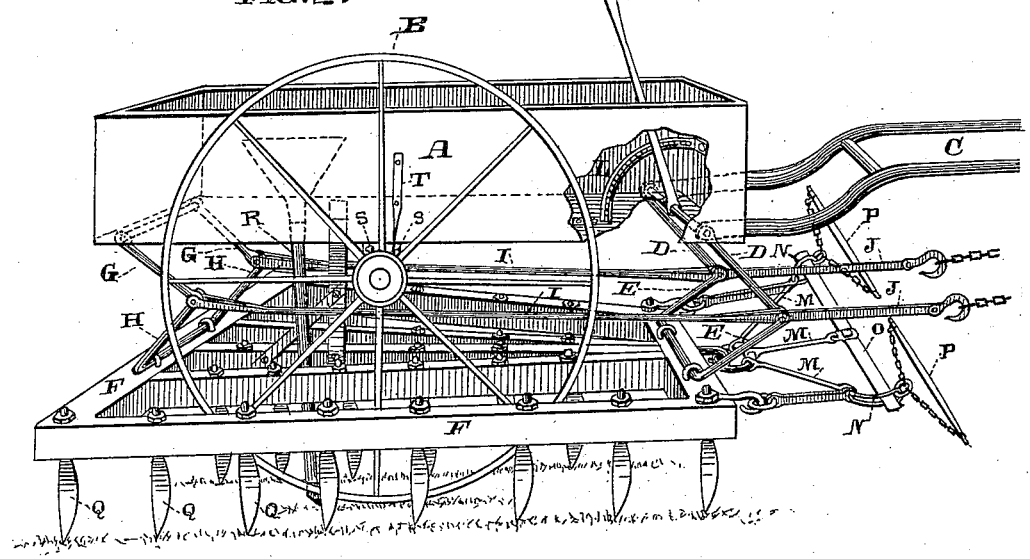

UNITED STATES PATENT OFFICE.

JOHN D. SCOTT, OF PETALUMA, CALIFORNIA.

AGRICULTURAL IMPLEMENT.

SPECIFICATION forming part of Letters Patent No. 337,525, dated March 9, 1886.

Application filed October 21, 1885. Serial No. 180,546. (No model.)

*To all whom it may concern:*

Be it known that I, JOHN D. SCOTT, of Petaluma, Sonoma county, State of California, have invented an Improvement in Agricultural Implements; and I hereby declare the following to be a full, clear, and exact description of the same.

My invention relates to an implement or apparatus for cultivating the ground, and for planting potatoes and similar articles.

It consists of a frame having peculiarly-shaped adjustable teeth or cutters, a vehicle mounted upon wheels, and a means for suspending the frame with its teeth from said vehicle so that it may be raised or lowered at will, and a mechanism by which the draft is applied both to the vehicle and the cultivator, together with a device for planting the potatoes, and means for indicating the distance between the hills, and various details of construction, all of which will be more fully explained by reference to the accompanying drawings, in which—

Figure 1 is a side elevation, and Fig. 2 a perspective view, of my invention.

A is the body or cart, which is mounted upon an axle having the bearing-wheels B at its opposite ends. From the lower front portion of the body A a pair of shafts, C, extend forward, being preferably curved upward, as shown. The rear end of these shafts may be connected with a rod or bar journaled along the front of the cart-body, so that, when desired, the cart may be turned backward to dump any load which it may carry. Upon the ends of this shaft are crank-arms D, which extend forward and downward, having their lower ends united with similar arms, E, extending upward and forward from the cultivator or harrow frame F. At the rear end of the vehicle are two similar arms, G and H, and the apex or angle at which the arms G and H meet is connected with the apex or meeting angle of the arms D and E by rods I, so that the four sets of levers will move simultaneously, thus acting to raise or depress the cultivator-frame F. From the front or meeting angles, D and E, rods J extend forward, and to these rods the traces of one of the horses are connected. I have found it preferable in operating this machine to drive three horses abreast, the central one being the shaft-horse and having his traces connected with these rods J.

K is a hand-lever, the lower end of which is bolted to the arms D, at one side of the vehicle-body, and L is a holding-rack by which this lever is retained at any desired point. When the cultivator-frame F is thrown down, the lever K will be thrown forward, and will be held at any desired point by the rack L, thus keeping the cultivator as low as may be desired, so that its teeth will act properly upon the soil. By means of the connecting-rods J the power of the shaft-horse is applied directly to the meeting angles of the lever-arms D and E, and the vehicle or cart and the cultivator-frame are drawn upon equally by the shaft-horse.

M M are rods, which are connected centrally with the cultivator-frame and extend diagonally forward and outward, having their outer ends connected by rings with the clasps N, which are secured to the ends of the draft-bar O. The center of this draft-bar is also connected with the center of the cultivator-frame by a rod, M.

To the outer end of the draft-bar O the single-trees P are connected by a similar arrangement of rods to that shown at M, and the two outside horses are attached to these single-trees, their power being thus applied directly to draw the cultivator-frame. By this arrangement I distribute the power of the team so that it will work to the best advantage.

Whenever it is necessary to raise the cultivator, so as to lift the teeth out of the ground, it is only necessary to release the lever K from the rack L, at the same time pressing slightly upon it, when the power of the central horse will be applied, drawing upon the meeting angles of the levers D and E and through the rods I upon the corresponding angles of the levers G and H, so that the power of the horse will be applied to raise the cultivator with comparatively little assistance from the lever K. The lever may be latched again upon the rack L, so as to hold the cultivator clear of the ground when it is desired to have the vehicle travel to any point without working.

Holes are made vertically through the frame

F of the cultivator, and the shanks of the teeth or cutters Q pass through these holes. These teeth are made in the form of thin flat blades, shaped something like a mason's trowel, extending directly down into the ground, the two opposite edges being sharpened.

When the teeth are held in line with the direction of travel, they loosen up and pulverize the soil without turning it in either direction. By loosening the nuts upon the upper ends of the shanks these teeth may be turned so as to stand at any desired angle with the direction of travel, and they then serve to throw the dirt to one side or the other, acting as plows. From the interior of the vehicle-body A tubes R extend downward, the lower ends being open and placed with such relation to the teeth upon the frame that the teeth just forward of the tube will make a channel, into which potatoes may be dropped through the tube at intervals, and the teeth following serve to cover them up.

S S are small points or projections fixed upon the wheel-axle, and T is a spring-arm secured to the side of the vehicle and projecting downward, so that these points will strike it as the wheel revolves, and by the noise will indicate the exact time at which the potato must be dropped so as to secure the proper intervals between them.

If desired, a dropping-slide might be arranged in the tube R and connected with the spring-arm T; but I have found in practice that the work can be much better done by hand, it only being necessary to indicate the point at which the potato must be dropped, and this is done perfectly by the device here described.

The vehicle may be provided with a covered top for comfort, and a foot-board may be supported upon a post or frame upon the cultivator-frame and extend up through the bottom of the vehicle.

Having thus described my invention, what I claim as new, and desire to secure by Letters Patent, is—

1. A vehicle-body supported upon wheels, and the cultivator or harrow frame suspended beneath by the angular links or levers connected with its front and rear end, and having their meeting angles connected by a rod, in combination with rods or links J, whereby the forward angles may be connected with the draft-horse, substantially as and for the purpose herein described.

2. A vehicle-body having a cultivator or harrow frame suspended beneath by links which are connected by rods extending between their meeting angles, in combination with the rods J to which the draft-animal is connected, and the hand-lever K, and the holding-rack, substantially as and for the purpose herein described.

3. A vehicle-body mounted upon wheels and having a cultivator suspended beneath it, in combination with a double series of links or levers connected with the front and rear of the body, and the draft-rods connected with them, whereby the cultivator may be raised and depressed by the movement of the team, substantially as set forth.

4. The vehicle-body mounted upon wheels and having a cultivator suspended adjustably beneath it, in combination with the tube or tubes R, extending downward from the vehicle, so that articles may be dropped into the trench formed by one set of teeth and covered by the following, substantially as herein described.

5. The cultivator-frame suspended beneath the vehicle-body by the angularly-joined levers united by rods or links extending between the joints of the front and rear sets of levers, and the draft-rods J, connecting with the joints of the front set, in combination with the draft-bar, the single-trees, and connecting-rods, whereby they are united with the cultivator-frame, so as to regulate the draft on the vehicle and the cultivator, substantially as herein described.

In witness whereof I have hereunto set my hand.

JOHN D. SCOTT.

Witnesses:
S. H. NOURSE,
H. C. LEE.